United States Patent [19]

Mager

[11] Patent Number: 4,678,966
[45] Date of Patent: Jul. 7, 1987

[54] FLUORESCENT LAMP HAVING TWO PHOSPHOR LAYERS

[75] Inventor: Eric L. Mager, Beverly, Mass.

[73] Assignee: GTE Products Corporation, Danvers, Mass.

[21] Appl. No.: 159,025

[22] Filed: Jun. 13, 1980

[51] Int. Cl.⁴ .............................................. H01J 1/62
[52] U.S. Cl. .................................... 313/487; 313/486
[58] Field of Search ................................ 313/486, 487

[56] References Cited

U.S. PATENT DOCUMENTS

| | | | |
|---|---|---|---|
| 3,602,757 | 8/1971 | Wachtel | 313/487 |
| 3,937,998 | 2/1976 | Verstegen et al. | 313/487 |
| 4,069,441 | 1/1978 | Wanmaker et al. | 313/487 |
| 4,110,660 | 8/1978 | Wolfe | 313/486 |
| 4,251,750 | 2/1981 | Gallien et al. | 313/487 |

Primary Examiner—David K. Moore
Attorney, Agent, or Firm—James Theodosopoulos; William H. McNeill; Martha Ann Finnegan

[57] ABSTRACT

A fluorescent lamp has two layers of different phosphors, the underlying phosphor serving to improve the maintenance of the overlying phosphor.

1 Claim, 2 Drawing Figures

FLUORESCENT LAMP HAVING TWO PHOSPHOR LAYERS

TECHNICAL FIELD

This invention is concerned with fluorescent lamps. Such lamps are low-pressure-mercury arc-discharge devices containing an inert gas and having a phosphor coating on the inner surface of the lamp envelope.

BACKGROUND ART

This invention is particularly concerned with fluorescent lamps having more than one phosphor layer, for example, two phosphor layers, one superposed on the other. Such superposed double layers have been used to improve maintenance or to reduce phosphor cost and are shown in U.S. Pat. Nos. 3,602,757, 3,602,758 4,070,598 and 4,088,923.

In U.S. Pat. Nos. 3,602,757 and 4,070,598 the first or outer phosphor layer provides a desired color of light but has low lamp maintenance. The second or inner layer has a high maintenance and serves to screen the outer layer from damaging short wavelength radiation from the arc discharge, thereby improving lumen maintenance of the phosphor in the outer layer.

In U.S. Pat. No. 3,602,758, the outer phosphor layer comprises relatively inexpensive material while the inner phosphor layer comprises more expensive material. This arrangement permits use of less of the expensive material necessary to provide a desired spectral energy distribution than if both materials had been blended and applied as a single layer.

U.S. Pat. No. 4,088,923 also involves use of an outer layer of inexpensive phosphor and an inner layer of more expensive phosphor. The patent is concerned with the color of the light emitted by the lamp and discloses that the inner layer should be sufficiently thick to convert at least 80% of the ultraviolet radiation from the arc discharge into light.

In my invention the primary consideration is the improvement of maintenance of a fluorescent lamp by providing an underlying additional phosphor layer beneath that of the overlying desired phosphor.

DISCLOSURE OF THE INVENTION

In this invention the maintenance (maintained brightness) of a fluorescent lamp having a desired phosphor is increased by providing an underlayer of a different phosphor. The increase in maintenance is greater than that which would occur if the underlayer consisted of the desired phosphor.

This invention differs from that disclosed in U.S. Pat. No. 3,602,757 in that the desired phosphor therein is the first or outer phosphor layer, that is to say, a phosphor underlayer on or closer to the glass envelope of the lamp, while in this invention the desired phosphor is the superposed or inner phosphor layer, that is to say, the layer further from the glass or closer to the arc discharge. In U.S. Pat. No. 3,602,757 the superposed phosphor layer has high maintenance and serves to screen the phosphor underlayer from damaging short wavelength radiation, thereby improving maintenance of the underlying phosphor. In this invention, the underlying phosphor is different from the desired phosphor and increases the maintenance of the desired phosphor to a greater extent than if the underlying phosphor layer comprised the same desired phosphor or if the coated weight of the desired phosphor was equal to that of both layers. It is unexpected that such an underlying layer can increase the maintenance of the superposed phosphor layer beyond that obtainable by using the superposed phosphor alone as the sole phosphor layer in the lamp at optimum coating weight. It is in this respect that this invention differs from the double phosphor layer lamps of the prior art discussed above under Background Art. In no case there does a double phosphor layer lamp have better maintenance than a lamp utilizing only the superposed phosphor at optimum coating weight. The phosphor layers may consist of single phosphors or blends in this invention.

DESCRIPTION OF PREFERRED EMBODIMENT

Figure 1:
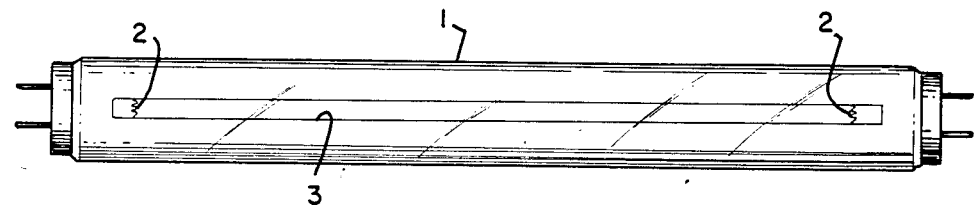
FIG. 1 shows a fluorescent lamp in accordance with this invention and FIG. 2 is a schematic sectional representation of the various layers of the lamp.

One example of a lamp in accordance with this invention, as shown in FIG. 1, was an 18 watt T8 aperture lamp used in photocopy apparatus. The lamp comprised a glass envelope 1 having electrodes 2 at its ends. There was an aperture 3 in the lamp.

Figure 2:
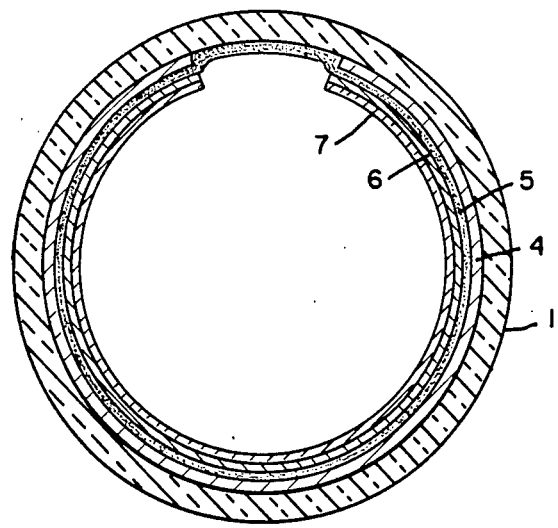

As shown in FIG. 2, the first coating on the internal surface of envelope 1 was a reflector layer 4, which was absent in aperture portion 3. Next, there was a protective alumina layer 5 on reflector layer 4 and also in aperture portion 3. The underlying phosphor layer 6 was deposited thereover, except on aperture portion 3. Finally, layer 7 comprising the desired phosphor was deposited on layer 6. Methods of making such aperture lamps are known and are shown, for example, in U.S. Pat. Nos. 3,717,781 and 4,061,946.

In this example, the desired phosphor is manganese activated magnesium gallate. When the Mn activated magnesium gallate was used alone, as layer 7, without an underlying phosphor layer 6, the weight of phosphor on envelope 1 being 1.4 grams, the brightness of the lamp in arbitrary units was 31.7 at 0 hours, 29.2 at 100 hours and 25.4 at 750 hours, the 750 hour maintenance being 80.1%. When the Mn activated magnesium gallate was applied at about double the weight, 2.8 gram, as a single layer, there being no underlying phosphor layer 6, the results were 33.3 at 0 hours, 32.3 at 100 hours and 29.4 at 750 hours, the 750 hour maintenance being 88.3%. The results were almost identical when the Mn activated magnesium gallate was applied as two separate layers, 1.3 grams in layer 6 and 1.3 grams in layer 7; the results were 32.6 at 0 hours, 31.8 at 100 hours and 28.8 at 750 hours, the 750 hour maintenance being 88.3%. However when a different phosphor, cerium terbium magnesium aluminate, was used in dnderlying phosphor layer 6, the maintenance improved dramatically. With layer 6 comprising 1.2 grams of cerium terbium magnesium aluminate, and layer 7 comprising 1.3 gram of Mn activated magnesium gallate, the results were 33.6 at 0 hours, 33.6 at 100 hours and 33.0 at 750 hours, the 750 hour maintenance being a surprising 98.2%.

In the above lamp, the weight of Mn activated magnesium gallate normally used is about 1.2 to 1.4 grams, and since the same weight was used when underlying phosphor layer 6 was present, the Mn activated magnesium gallate of layer 7 absorbed substantially all of the UV radiation emitted by the mercury arc. Substantially none of the UV penetrated to layer 6. Thus, substantially no radiation was emitted by the cerium terbium magnesium aluminate, and the spectral power distribution curves of the lamps with and without underlying phosphor layer 6 were substantially identical.

I claim:

1. A fluorescent lamp comprising a glass envelope having electrodes at its ends and containing a discharge-substaining filling of mercury and inert gas, and two layers of different phosphors on the inner surface of the lamp envelope, the underlying phosphor layer increasing the maintenance of the overlying phosphor to a greater extent than if the underlying layer comprised the same phosphor as that of the overlying layer or if the only phosphor present were that of the overlying layer and in a weight about equal to that of both layers, wherein the overlying phosphor comprises manganese-activated magnesium gallate and the underlying phosphor comprises cerium terbium magnesium aluminate.

* * * * *